United States Patent Office 3,597,382
Patented Aug. 3, 1971

3,597,382
CARBOXYL-CONTAINING ETHYLENE COPOLYMERS
George N. Foster, Hillsborough Township, N.J., assignor to Union Carbide Corporation
No Drawing. Filed Oct. 30, 1967, Ser. No. 679,207
Int. Cl. C08f 45/44; C08k 1/44
U.S. Cl. 260—32.6                                            16 Claims

ABSTRACT OF THE DISCLOSURE

The slip properties of both carboxyl containing ethylene polymers containing from about 2 to 25% by weight of an α, β-ethylenically unsaturated carboxylic acid and alkali metal, alkaline earth, or zinc salts, of these copolymers have been improved by incorporating therein from about 0.02 to 1.0% by weight of secondary fatty acid amides containing from about 20 to 24 carbon atoms and in which the nitrogen atom is substituted with a saturated hydrocarbon radical having from 14 to 26 carbon atoms.

---

This invention relates to carboxyl-containing ethylene copolymers and their alkali metal, alkaline earth or zinc ionomer salts and in particular to the improvement of the slip properties of these copolymers.

Ethylene/acrylic acid copolymers and ionomer salts thereof can be fabricated to films having excellent physical properties. However, exploitation of their full commercial potential is hindered by their poor slip properties. Although many materials have been used in the past for the improvement of slip properties of various polymer films, one cannot arbitrarily choose any additive for use with any polymer system. For example, there is a practical upper limit for the amount of slip additive which can be incorporated into the polymer and ideally the smallest amount possible is sought to be used. This requirement is due not only to economics but also to the fact that adverse odor, taste and feel as well as plating out problems with extrusion equipment used have to be considered. The lower limit is that amount which imparts the minimum slip improvement of commercial significance to the treated polymer film.

It has now been found that the slip properties of ethylene copolymers containing from about 2 to 25% by weight of an α, β-ethylenically unsaturated carboxylic acid copolymerized therein and having a melt index of about 0.01 to 50 decigrams per minute or inorganic salts of these carboxyl-containing polymers can be improved by incorporating therein from about 0.02 to 1.0% by weight, based on the weight of the total polymer composition, of an amphipathic compound having the formula:

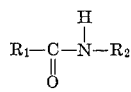

wherein $R_1$ is a mono-olefinically unsaturated hydrocarbon radical having 20 to 24 carbon atoms and $R_2$ is a saturated alkyl group having 14 to about 26 carbon atoms.

The α,β-ethylenically unsaturated carboxylic acids used in the interpolymers of this invention preferably have 3 to 8 carbon atoms, although those having a greater number of carbon atoms can also be used, if desired. Specific examples include: acrylic acid, methacrylic acid, ethacrylic acid, itaconic acid, maleic acid, fumaric acid, and half esters of the above dicarboxylic acids such as methyl hydrogen maleate, methyl hydrogen fumarate, ethyl hydrogen maleate, ethyl hydrogen fumarate and the like.

The starting interpolymers used to make the inorganic salts of this invention are not limited to two components.

Therefor, additional copolymerizable monomers can be employed together with the olefin and carboxylic acid comonomers. The scope of the starting interpolymers which can be used is exemplified, although not limited by the following interpolymers; ethylene/acrylic acid interpolymers, ethylene/methacrylic acid interpolymers, ethylene/itaconic acid interpolymers, ethylene/methyl hydrogen maleate interpolymers, ethylene/maleic acid interpolymers, ethylene/acrylic acid/methyl acrylate interpolymers, ethylene/acrylic acid/ethyl acrylate interpolymers, ethylene/methacrylic acid/methyl methacrylate interpolymers, ethylene/methacrylic acid/ethyl methacrylate interpolymers, ethylene/acrylic acid/methacrylic acid interpolymers, ethylene/methacrylic acid/methyl acrylate interpolymers, ethylene/acrylic acid/methyl methacrylate interpolymers, ethylene/methyl hydrogen maleate/ethyl acrylate interpolymers, ethylene/acrylic acid vinyl acetate, ethylene/methacrylic acid/vinyl acetate interpolymers, ethylene/propylene/acrylic acid interpolymers, ethylene/propylene/methacrylic acid interpolymers, ethylene/maleic acid/ethyl vinyl ether interpolymers, ethylene/butene-1/acrylic acid interpolymers, ethylene/neohexene/acrylic acid interpolymers, propylene/acrylic acid interpolymers and the like.

Examples of alkali metal salts of carboxy-containing polymers are those containing the cations sodium+, potassium+, lithium+, and the like. Correspondingly, alkaline earth salts of carboxyl-containing polymers are those containing cations such as $Ca^{++}$, $Ba^{++}$, $Sr^{++}$, and the like. These and zinc polymer salts can be prepared by reacting the starting carboxyl containing olefin polymer with metal salts such as carbonates or bicarbonates; metal bases such as hydroxides or alkoxides; metal alkyls such as sodium ethyl, butyl lithium and the like; metal aryls such as phenyl lithium, potassium naphthalene and the like; hydrides of sodium, potassium, lithium or calcium and the like; amides of sodium or potassium and the like; oxides such as sodium peroxide, barium peroxide, zinc oxide and the like; or in the case of alkali metal salts even with the free alkali metal itself.

The preferred amphipathic compounds represented by the formula shown above include: behenyl erucamide, arachidyl erucamide, stearyl erucamide, palmityl erucamide and the like. It is particularly preferred to employ stearyl erucamide as the amphipathic compound of this invention. Other compounds which can be used include palmityl gadoleamide, palmityl cetoleamide, palmityl nervonamide, stearyl gadoleamide, stearyl cetoleamide, stearyl nervonamide, arachidyl gadoleamide, arachidyl cetoleamide, arachidyl nervonamide, lignoceryl gadoleamide, lignoceryl cetoleamide, lignoceryl nervonamide, cerotyl gadoleamide, cerotyl cetoleamide, cerotyl nervonamide, behenyl gadoleamide, behenyl cetoleamide, behenyl nervonamide and the like.

Although a range of from about 0.02 to 1.0% by weight, based on the weight of the total composition, can be used in this invention it is preferred to use a range of about 0.1 to 1.0% with 0.1 to 0.5% being particularly preferred of the amphipathic compound.

The amphipathic compound and additives may be incorporated into the polymers of this invention by mixing techniques well known in the polymer art. Thus, for example, dry blending, melt extrusion, Banburying and the like can be employed. In a preferred method the polymer is extruded with amphipathic compound in a plasticizing extruder and then fed to a film processing extruder. The claimed compositions are particularly useful in the fabrication of blown film and biaxially oriented film but are adaptable to the fabrication of films made by other techniques such as flat extrusion, solvent casting, and the like.

Support for the statement that the choice of additives to impart slip properties to the carboxyl-containing polymers of this invention is not an arbitrary one supplied by random selection of those described for polymers in general in the prior art is supported by the fact that slip and anti-blocking additives used with polyethylene such as N-monosubstituted derivatives of oleamide as for example, N-(n-dodecyl) oleamide, N-(n-myristyl) oleamide, N-(n-palmityl) oleamide, N-(octadecyl) oleamide and the like which function well with polyethylene are not satisfactory in the compositions of this invention. Another class of additives which work with polyethylene but not with the claimed compositions are unsubstituted amides of either unsaturated fatty acids such as oleic, elaidic, or brucic acids or saturated fatty acids such as stearic, arachidic, behenic, lignoceric, cerotic acids and the like. Still another group of additives used for improving the slip of polyethylenes are the N-oleyl derivatives of fatty acid amides in which the alkyl moieties of the fatty acid is derived from capric acid, myristic acid, stearic acid, erucic acid, palmitic acid and the like. Slip properties are determined by the coefficient of friction test method described in ASTM D-1894-63. The values given are units of force determined at a specified time interval after the films were prepared. The values given for each film indicate the coefficient of friction obtained at the outside of each film since films were prepared by a tubular extrusion process from which the film is taken in tubular form, rolled in collapsed form and then slit into flat sheets prior to testing. The ionomer compositions falling within the purview of this invention also exhibited improved anti-blocking properties as well as enhanced slip-characteristics.

The invention is further described by the examples which follow in which parts and percentages are by weight unless otherwise specified.

EXAMPLE 1

Since the effect of a range of additive concentrations on the slip properties of the olefin copolymers was to be evaluated, 3 master batches were prepared to afford resin levels of 0.1%, 0.2%, and 1.0% by weight respectively. The master batch used to prepare a test composition containing 1% additive was prepared as follows. An ethylene/acrylic acid copolymer containing about 13% by weight acrylic acid copolymerized therein and having a melt index of 5 dg./min. (388 grams) was fluxed on a 3" x 6" steam heated 2 roll mill using a front roll temperature of 220° F. and a rear roll temperature of 150° F. After complete fluxing of the ethylene/acrylic acid copolymer 12 grams of stearyl erucamide was mixed with the ethylene copolymer on the mill. When complete mixing was achieved the copolymer-additive mixture was sheeted off, cooled and granulated to yield a resin form suitable for melt extrusion. The copolymer-additive mixture was kept in this form until immediately prior to extrusion into film form at which time 400 grams of the above described master batch which contains 3% by weight of additive was blended with 800 grams of the same ethylene/acrylic acid copolymer as described above thereby yielding a copolymer-additive mixture containing 1.0% by weight of additive. This copolymer-additive mixture was immediately processed into a film by means of a small blown film line which employed a 1" National Rubber Machine Corporation extruder having a metering screw conventionally used for polyethylene type resins and a 2" Egan tubular die (0.022" die gap). The process conditions used for the extrusion of film are shown in Table 1.

TABLE 1

Barrel temperature #1—250° F.
Barrel temperature #2—325° F.
Adapter temperature—325° F.
Die temperature—350° F.
Screw speed—32"/min.
Head pressure—1,000 p.s.i.
Take-off speed—10"/min.
Flat width—6¼"
Film thickness—1¼ mils
Screw cooling—No
Air ring cooling of bubble—Medium

EXAMPLE 2

The procedure described in Example 1 was followed with the exception that a master batch containing 0.6% by weight of additive was prepared by fluxing 397.6 grams of ethylene/acrylic acid copolymer with 2.4 grams of stearyl erucamide. As in Example 1 this master batch was stored until immediately prior to extrusion film at which time 400 grams of the copolymer-additive mixture was blended with 800 grams of ethylene/acrylic acid copolymer to yield a polymer-additive mixture containing 0.2% by weight of stearyl erucamide. The film extruder conditions were the same as those described in Table 1.

EXAMPLE 3

In order to prepare a copolymer-additive mixture (0.1% by weight additive) and extrude it into film 200 grams of the 0.6% by weight master batch prepared in Example 2 was blended with 1,000 grams of the ethylene/acrylic acid copolymer. This was immediately extruded into film as described in Example 1 under the same conditions described in Table 1.

EXAMPLES 4–12

Using the procedures described in Examples 2 and 3 employing an ethylene/acrylic acid copolymer having 2% by weight acrylic acid copolymerized therein and a melt index of 2 dg./min. as the ethylene copolymer and a series of fatty amides as the additive, the coefficient of friction of tubular films specimens containing 0.1% and 0.2% by weight respectively of additive was measured on the outer surfaces of the tubular film. The evaluation of the various combinations was made using the coefficient of friction value when measured after 24 hours of 0.1 to 0.3% as an acceptable range for commercial acceptance. The date obtained and shown in Table 2 indicate that only secondary amides were suitable additives and that of these only those having a structure wherein the fatty acid amide itself was unsaturated and the N-substituent was saturated afford copolymer compositions having satisfactory slip properties. Control A was used in Table 2 to designate the unmodified ethylene/acrylic acid copolymer with no additive blended in.

EXAMPLES 13–30

The procedures as described in Examples 2 and 3 were used to provide tubular films of an ethylene/acrylic acid copolymer containing 4% by weight of acrylic acid copolymerized therein and having a melt index of 2 dg./min. blended with a series of amide slip additives. The results shown in Table 2 are similar to those obtained in Examples 4–12. Control B indicates the ethylene/acrylic acid copolymer containing no slip additive.

EXAMPLES 31–42

The procedure described in Example 2 was used to provide tubular films of an ethylene/acrylic acid copolymer containing 13% acrylic acid copolymerized therein and having a melt index of 5 dg./min. containing a series of amide slip additives. The results shown in Table 3 of the coefficient of friction of the outer surfaces of tubular films after 2 weeks show the narrow range of acceptable amides suitable for improving the slip properties of these copolymers. Control C is the ethylene/acrylic acid copolymer tubular film containing no slip additive.

EXAMPLES 43–50

The effect of amide slip additives on ionomers was demonstrated with an ethylene/acrylic acid copolymer containing 15% acrylic acid copolymerized therein and having a melt index of 50 dg./min. 45% of which was converted to the sodium salt ionomer. Following the procedure of Example 2, tubular films of this polymer containing 0.2% slip additive were prepared and after storage in the flat condition for 24 hours, the outside coefficient of friction was measured. As can be seen from the data in Table 3 secondary fatty amides which are satisfactory slip additives for the ethylene/acrylic acid copolymers also serve for the ionomers and correspondingly other amides which are not satisfactory for use with the ethylene/acrylic acid copolymers are likewise unsatisfactory with the ionomer.

TABLE 2

| Additive | | Coefficient of friction [1] | |
|---|---|---|---|
| Identity | Concentration, wt. percent | Examples 4–12 | Examples 13–30 |
| Palmityl erucamide | 0.2 | 0.23 | 0.19 |
| Stearyl erucamide | 0.1 | 0.30 | |
| Do | 0.2 | 0.29 | 0.25 |
| Behenyl erucamide | 0.2 | 0.24 | 0.24 |
| Oleamide | 0.2 | | 0.72 |
| Erucamide | 0.1 | | 0.56 |
| Do | 0.2 | 0.33 | 0.51 |
| Stearamide | 0.1 | | 0.58 |
| Do | 0.2 | 0.33 | 0.56 |
| Behenamide | 0.1 | | 0.66 |
| Do | 0.2 | 0.42 | 0.61 |
| Oleyl palmitamide | 0.1 | 0.48 | 0.59 |
| Do | 0.2 | | 0.47 |
| Oleyl oleamide | 0.1 | 0.47 | 0.63 |
| Do | 0.2 | 0.50 | 0.58 |
| Stearyl oleamide | 0.2 | | 0.62 |
| Palmityl oleamide | 0.2 | | 0.92 |
| Stearyl stearamide | 0.1 | 0.40 | 0.45 |
| Do | 0.2 | 0.30 | .044 |
| Control A | 0 | 0.72 | |
| Control B | 0 | | 0.83 |

[1] Measured on outside—outside surfaces of flattened extrusion tube 24 hours after extrusion.

TABLE 3

| Additive | | Coefficient of friction | |
|---|---|---|---|
| Identity | Concentration, wt. percent | Examples 31–42 [1] | Examples 43–50 [2] |
| Palmityl erucamide | 0.2 | 0.14 | 0.21 |
| Stearyl erucamide | 0.2 | 0.15 | 0.20 |
| Behenyl erucamide | 0.2 | 0.23 | [2] 0.19 |
| Lauryl erucamide | 0.2 | >2.0 | |
| Erucamide | 0.2 | >2.0 | 0.77 |
| Stearamide | 0.2 | >2.0 | 1.0 |
| Behenamide | 0.2 | >2.0 | 2.0 |
| Oleyl palmitamide | 0.2 | >2.0 | |
| Oleyl oleamide | 0.2 | >2.0 | 1.2 |
| Palmityl oleamide | 0.2 | >2.0 | |
| Stearyl oleamide | 0.2 | >2.0 | |
| Stearyl stearamide | 0.2 | 0.86 | 0.51 |
| Control C | 0 | >2.0 | |
| Control D | 0 | | >2.0 |

[1] Measured on outside—outside surfaces of flattened extrusion tube 2 weeks after extrusion.
[2] Measured on outside—outside surfaces of flattened extrusion tube 24 hours after extrusion.

EXAMPLES 51–59

In order to demonstrate the unpredictability of various amides as slip additives in thermoplastic polymer films, polyethylene having a density of 0.922 gram per cc. and a melt index of 2 dg./min. was blended with various amides following the procedure of Example 2 and extruded into a tubular film which was stored for 24 hours in a collapsed state. After this time the coefficient of friction of the outside surfaces was measured. These results delineated in Table 4 indicate that secondary fatty acids amide which are uniquely useful as slip additives in the polymer compositions of this invention do not afford satisfactory slip properties with this polyethylene at either 0.1 weight percent or 0.2 weight percent level and that other fatty amides which are not useful with the polymers of this invention give excellent slip properties to polyethylene.

EXAMPLES 60–63

Another example of a thermoplastic copolymer which does not exhibit the same susceptibility to slip improvement that the copolymers of the present invention do is an ethylene/vinyl acetate copolymer having a melt index of 0.8 dg./min. and containing 3.5 weight percent vinyl acetate copolymerized therein. This copolymer was blended with 4 amides as described in Example 2 to afford a copolymer composition containing 0.2 weight percent slip additive. After extrusion into tubes this material was measured for coefficient of friction after storing in the flat condition for 2 weeks. The data obtained are shown in Table 4.

TABLE 4

| Additive | | Coefficient of friction | |
|---|---|---|---|
| Identity | Concentration, wt. percent | Examples 51–59 [1] | Examples 60–63 [2] |
| Stearyl erucamide | 0.1 | 0.37 | |
| Do | 0.2 | | 0.32 |
| Behenyl erucamide | 0.1 | 0.34 | |
| Do | 0.2 | 0.33 | 0.41 |
| Oleyl oleamide | 0.1 | 0.48 | |
| Do | .2 | 0.37 | |
| Erucamide | 0.1 | 0.08 | |
| Do | 0.2 | 0.08 | 0.06 |
| Stearamide | 0.1 | 0.27 | |
| Do | 0.2 | 0.23 | 0.21 |
| Control E | | 0.61 | |
| Control F | | | 0.92 |

[1] Measured on outside—outside surfaces of flattened extrusion tube 24 hours after extrusion.
[2] Measured on outside—outside surfaces of flattened extrusion tube 2 weeks after extrusion.

EXAMPLES 64–73

The anti-blocking properties of the ionomer described in Examples 43–50 have also been improved by the presence of the amphipathic compounds of this invention as shown in Table 5 where the control value of 205 grams is reduced to below 30 grams whereas erucamide actually increases the blocking force. The test used to measure anti-blocking properties is described in U.S. 3,028,355 and is a measure of the force and grams necessary to separate 6″ to by 5″ sections of film between 6″ by 6″ glass plates after aging at 50° C. under a pressure of 0.2 p.s.i. for about 24 hours.

TABLE 5

| Additive | | Examples 64–73 |
|---|---|---|
| Identity | Concentration, weight, percent | blocking force,[1] g. |
| Palmityl erucamide | 0.2 | 17 |
| Stearyl erucamide | 0.2 | 27 |
| Behenyl erucamide | 0.2 | 17 |
| Control G | | 205 |

[1] Samples of outside—outside extrusion tube aged at 50° C. at 0.2 p.s.i. for 48 hours.

EXAMPLE 74

Using the procedure described in Example 1, a blown film was prepared from an ethylene/acrylic acid copolymer containing 13% acrylic acid by weight and having a melt index of 5 dg./min. and stearyl erucamide as the amphipathic slip additive present in a concentration of 1% by weight. The coefficient of friction of outside surfaces of the tube measured immediately after extrusion was 0.17 and the blocking force when measured after 4 weeks storage was 30 grams. A control (H) containing no additive had a blocking force of 250 grams.

EXAMPLES 75–84

When Examples 64–73 are repeated with the exception that the ionomer is a potassium salt rather than a sodium salt essentially similar slip improvement is obtained.

The amphipathic additives of this invention are secondary amides and can be regarded as N-alkylated fatty acid amides. They are commercially available but can be readily prepared by the reaction of a saturated aliphatic amine with an ethylenically unsaturated fatty acid or the acyl halide of the ethylenically unsaturated fatty acid. Methods of secondary amide preparation which are incorporated herein by reference are the Encyclopedia of Chemical Technology, vol. 1, pages 670–671, R. E. Kirk and D. F. Othmer, Interscience Publishers Incorporated, N.Y.C. 1960; and Fatty Acids and Their Derivatives by A. W. Ralston, pages 582–583, John Wiley & Sons, Incorporated, New York, 1948.

It will be understood by those skilled in the art that minor amounts, that is up to about 1% by weight, of other materials such as pigments, antioxidants, dyes, fillers, lubricants, and the like can be incorporated into the compositions of this invention, as well as anti-blocking additives as for example diatomaceous earth, amorphous silica, crystalline silica and the like.

EXAMPLE 85

The procedure described in Example 1 was followed with the exception that a master batch containing 1.5% by weight of additive was prepared by fluxing 394 grams of ethylene/acrylic acid copolymer (13% by weight acrylic acid and melt index of 5 dg./min.) with 6 grams of stearyl erucamide. The granulated master batch resin was then blended with 800 grams of the ethylene/acrylic acid copolymer used above, to yield a polymer-additive mixture containing 0.5% by weight of stearyl erucamide. This mixture was then melt extruded in a one inch National Rubber Machine Corporation Extruder through a one inch Egan tubular die and then air quenched to form a primary tube 18 mils thick having a flat width (when collapsed) of 2.5 inches. The primary tube was then passed through a set of nip rolls rotating at 2.5 feet per minute (f.p.m.) into a heated orientation zone where the primary tube was heated to its orientation temperature (10 to 20° C. less than its melting point or about 98° C.) and then inflated with air expanding the tube to 5 times its original diameter. Simultaneously, the machine direction stretch was applied by a second set of nip rolls rotated at 12.5 f.p.m. through which the film, now oriented, and ¾ mil thick was passing. The coefficient of friction of this film when measured as described above after two weeks storage on outside to outside surfaces was found to be 0.18.

A control (H) film, prepared in exactly the same way as Example 85 with the exception that erucamide was used as the additive instead of stearyl erucamide showed no improvement in slip behavior over that of unmodified film also prepared in the same way as Example 85.

Although the invention has been described in its preferred forms with a certain degree of particularity, it is understood that the present disclosure has been made only by way of example, and that numerous changes can be made without departing from the spirit and scope of the invention.

What is claimed is:
1. The composition comprising:
(a) an ethylene copolymer selected from the class consisting of (1) carboxyl-containing ethylene copolymers containing from about 2 to 25% by weight of an α,β-ethylenically unsaturated carboxylic acid copolymerized therein and having a melt index of about 0.01 to 50 dg./min. and (2) inorganic salts of said carboxyl-containing ethylene polymers wherein about 10 to 100% by weight of the carboxyl groups contain cations selected from the group consisting of alkali metal, alkaline earth and zinc cations; and
(b) from about 0.02 to 1.0% by weight based on the weight of the total composition of an amphipathic compound having the formula:

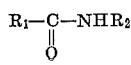

wherein $R_1$ is an ethylenically unsaturated hydrocarbon radical having from about 20 to 24 carbon atoms and $R_2$ is a saturated alkyl group having from about 14 to 26 carbon atoms.
2. The composition claimed in claim 1 wherein the ethylene copolymer is an ethylene/acrylic acid copolymer.
3. The composition claimed in claim 2 wherein the amphipathic compound is stearyl erucamide.
4. The composition claimed in claim 3 wherein the ethylene/acrylic acid copolymer contains about 2 to 15% acrylic acid copolymerized therein.
5. The composition claimed in claim 2 wherein the amphipathic compound is benhenyl erucamide.
6. The composition claimed in claim 2 wherein the amphipathic compound is palmityl erucamide.
7. The composition claimed in claim 1 wherein the ethylene copolymer is an alkali metal salt of a carboxyl-containing ethylene copolymer containing from about 2 to 25% by weight of an α,β-ethylenically unsaturated carboxylic acid copolymerized therein and having a melt index of about 0.01 to 50 dg./min.
8. The composition claimed in claim 7 wherein the alkali metal is sodium.
9. The composition claimed in claim 7 wherein the alkali metal is potassium.
10. The composition claimed in claim 7 wherein the amphipathic compound is stearyl erucamide.
11. The composition claimed in claim 7 wherein the amphipathic compound is benhenyl erucamide.
12. The composition claimed in claim 7 wherein the amphipathic compound is palmityl erucamide.
13. A film of a composition comprising:
(a) an ethylene copolymer selected from the class consisting of (1) carboxyl-containing ethylene copolymers containing from about 2 to 25% by weight of an α,β-ethylenically unsaturated carboxylic acid copolymerized therein and having a melt index of about 0.01 to 50 dg./min. and (2) inorganic salts of said carboxyl-containing ethylene polymers wherein about 10 to 100% by weight of the carboxyl groups contain cations selected from the group consisting of alkali metal, alkaline earth and zinc cations; and
(b) from about 0.02 to 1.0% by weight based on the weight of the total composition of an amphipathic compound having the formula:

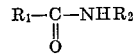

wherein $R_1$ is an ethylenically unsaturated hydrocarbon radical having from about 20 to 24 carbon atoms and $R_2$ is a saturated alkyl group having from about 14 to 26 carbon atoms.
14. The film claimed in claim 13 wherein the carboxyl-containing ethylene copolymer is an ethylene/acrylic acid copolymer.
15. The film claimed in claim 13 wherein the carboxyl containing ethylene copolymer is an ethylene/methacrylic acid.
16. The film claimed in claim 14 wherein the amphipathic compound is stearyl erucamide.

References Cited

UNITED STATES PATENTS 2,991,265   7/1965   Clark et al. _____ 260—32.6 P.O.

OTHER REFERENCES

Stille, John K.: Introduction to Polymer Chemistry, John Wiley & Sons, Inc., New York, 1962, p. 61.

ALLAN LIEBERMAN, Primary Examiner

J. H. DERRINGTON, Assistant Examiner